(No Model.)
W. L. DEMING
SPRAYING NOZZLE.
No. 557,977.
Patented Apr. 7, 1896.
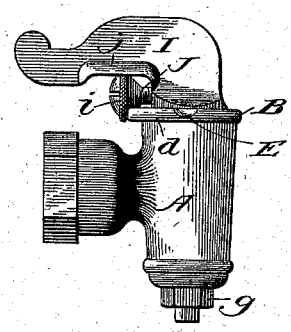
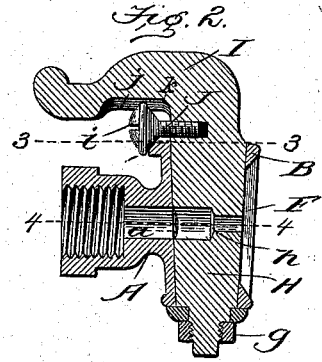
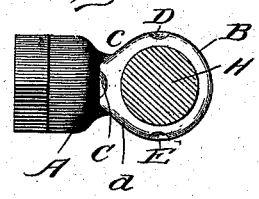
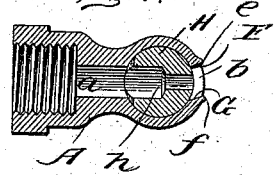
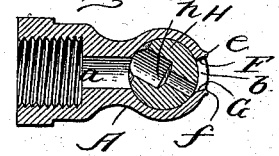
WITNESSES:
Edwin L. Bradford
Jas. W. Dyre.
INVENTOR
Wm. L. Deming
By Wm. E. Dyre
ATTORNEY

UNITED STATES PATENT OFFICE.

WILLIAM L. DEMING, OF SALEM, OHIO, ASSIGNOR TO THE DEMING COMPANY, OF SAME PLACE.

SPRAYING-NOZZLE.

SPECIFICATION forming part of Letters Patent No. 557,977, dated April 7, 1896.

Application filed November 6, 1895. Serial No. 568,132. (No model.)

*To all whom it may concern:*

Be it known that I, WILLIAM L. DEMING, a citizen of the United States, residing at Salem, in the county of Columbiana and State of Ohio, have invented certain new and useful Improvements in Spraying-Nozzles; and I do hereby declare the following to be a full, clear, and exact description of the invention, such as will enable others skilled in the art to which it appertains to make and use the same.

My invention relates to the art of spraying or coating, with various insecticide and fungicide compounds in solution, vines, plants, bushes, and trees for the purpose of ridding them of insect and fungus life, to which, in a greater or less degree, all vegetation is subject.

The invention has particular reference to a discharge-nozzle, having for its primary object a most thorough mixing and disintegration of the compounds or liquids employed when used in connection with a suitable spraying apparatus embodying a reservoir or reservoirs and a force-pump—such, for example, as that shown and described by me in a separate application for Letters Patent filed simultaneously herewith. This being the nature and object of the present invention, it will be seen, upon inspection of the accompanying illustrations, to embody certain special features of construction, including a body portion having inlet and outlet ports, an axially-rotatable valve-plug, means for throwing a fine mist-like spray over a broad surface, a somewhat coarser spray over a narrower surface and at greater distance or a solid stream, means for adjusting the device to produce the above effects, and means for locking the valve-plug in its several positions, all as will later more fully appear.

In the accompanying drawings, which form part of this specification, and in which like letters indicate similar parts wherever employed, Figure 1 represents a side elevation of my invention, showing a substantially cylindrical body portion, a regulating-handle, and an adjusting and locking screw. Fig. 2 indicates a central longitudinal section taken through the body, its inlet and outlet ports, a perforated valve-plug, a handle for regulating same, and a screw for locking the handle. Fig. 3 is a transverse section of the device, taken on line 3 3, Fig. 2; and Figs. 4 and 5, similar views on the line 4 4, Fig. 2, illustrating the valve-plug in position for throwing a solid stream and a broad fan-shaped mist-like spray, respectively.

Reference being had to the drawings and letters thereon, A indicates a body portion of substantially cylindrical form, having an inlet and outlet port $a$ $b$, respectively, and on one end a flange B, with tangential side surfaces $c$ $d$, combining to make a projecting lug, C, D, and E being depressions in said lug and in opposite sides of the flange B for a purpose that will later appear.

F and G represent spraying lips or surfaces flanking the outlet $b$, formed by a milling-tool directed to one side of the center, so that one of said lips is at an acute angle to the valve-seat, while their outer edges are beveled, as at $e$ $f$, to guard against mutilation and prevent dripping of the spraying solution.

H is a conical plug-valve ground to fit the interior of body A, which constitutes its seat, being adjustable therein by means of retaining-nut $g$ upon its smaller end for the purpose of taking up wear. In this plug-valve H a discharge-channel $h$ is formed, piercing same transversely at or near its center, said channel being reduced in area from its inlet to its discharge end. Projecting from its larger end the plug H is provided with an integral angular handle I as a means of rotating the plug upon its axis and directing a stream from channel $h$ upon one or the other of the spraying-lips F G or between the two. At the intersection of plug H and handle I, also at larger end of plug, is located a stop J, which, in conjunction with tangential surfaces $c$ $d$ and depressions C D E, serves to regulate the discharge of liquid from nozzle, as well as the character and quantity of spray produced. This stop J consists of a screw having an enlarged milled head $i$ and a threaded connection with the handle I, as shown by Fig. 2, said head being partially inclosed by overhanging lips $j$ on either side of a longitudinal groove $k$ in the under side of handle I.

By preference my invention is constructed of brass in order to withstand the oxidizing and corrosive effects of the various compounds commonly used with such devices, particularly fungicides, though, if desired, other metals may be used, and the construction being substantially as above set forth the operation is as follows:

Spraying liquid forced into inlet-port $a$ of the nozzle under pressure and in a more or less mixed condition is converted into a fine spray and discharged or discharged in a solid stream, as required. When the latter is desired, said plug is set in relation to the body of nozzle A, as indicated in Figs. 1, 2, and 4, with the screw-stop J immediately above the inlet-port $a$, in which position it may, if desired, be locked by engagement of the milled head $i$ with central depression C, a few turns of the screw into handle I serving the purpose. When, however, a spray-discharge is desired, said screw-stop J is similarly withdrawn and valve H rotated until the outlet end of channel $h$ assumes a relation to spraying lip or surface G which will enable the discharge from channel $h$ to impinge against said lip, as shown by Fig. 5. At this point screw-stop J may be reset so that its head $i$ engages the tangential surface $c$ on flange B, insuring the same relation of discharge-channel $h$ and spraying-lip G each time the valve is opened by operation of its handle I. It will further be noted that the adjustability of stop J in its threaded bearing permits a corresponding adjustment of the discharge-channel $h$ and spraying-lips F G, inasmuch as the head $i$ of said stop travels a greater or less distance up the incline or tangential surfaces $c$ $d$, according to the depth of said screw-stop in its threaded bearing, thus providing for a finer or coarser spray.

It will further be noted that the overhanging lips $j$ beneath handle I receive and partially inclose the head $i$ of stop J at all times and in all positions, thus sharing side thrusts and strains which would otherwise fall wholly upon the threaded end of said stop and interfere with its nicety of adjustment by mutilation of its threads or bending of its body.

If now a coarser spray is desired over a somewhat narrower surface, in more direct line of the discharge and thrown at greater distance, handle I is rotated until stop J assumes a similar relation with the opposite inclined or tangential surface $d$ upon flange B, whereupon the operation upon spraying-lip F will be similar to that upon lip G, except as to the angle of deflection, which will be less.

When in the course of operation it becomes desirable to entirely close valve H, as for the purpose of economizing spraying mixtures when conveying same from one part of a garden to another, this is effectively accomplished by a partial rotation of handle I, on one side or the other, until stop J is in position to engage one of the depressions D E, into which it may be set by a turn of its threaded connection.

This being substantially the construction and use of my invention, what I claim is—

1. In a discharge-nozzle the combination with a body portion and rotatable valve seated therein, of an adjustable stop for limiting rotation of the valve, a guideway for the outer end of said stop, and a lug one side of which is tangential to the body of nozzle for engagement by said stop, substantially as described.

2. In a discharge-nozzle the combination with a body portion and rotatable valve seated therein, of a valve rod or handle, an adjustable stop for limiting rotation of the valve, a guideway in said handle for the outer end of the stop, and a lug one side of which is tangential to the body of nozzle for engagement by the stop, substantially as described.

3. In a discharge-nozzle the combination with a body portion and rotatable valve seated therein, of an adjustable stop for limiting rotation of the valve, a guideway for the outer end of said stop, and a lug both sides of which are tangential to the body of the nozzle for engagement by said stop, substantially as described.

4. In a discharge-nozzle the combination with a body portion and rotatable valve seated therein, of a radially-adjustable stop for limiting rotation of the valve, a flange upon the body portion bearing a lug the sides of which are tangential to the body, and locking-depressions for engagement by the stop, substantially as described.

5. In a discharge-nozzle a body portion constituting a valve-seat and provided with inlet and outlet ports, the latter consisting of parallel spraying-lips beveled at their outer edges, one being at an acute angle to the valve-seat, substantially as described.

6. In a discharge-nozzle a rotatable valve having a projecting angular handle bearing a longitudinal groove upon its under side flanked by overhanging lips, an adjustable screw-stop in the handle guided and directed by said groove and lips, and a fixed lug upon the nozzle for engagement by the stop, substantially as described.

In testimony whereof I subscribe my signature in presence of two witnesses.

WILLIAM L. DEMING.

Witnesses:
W. U. FILLER,
W. W. HOLE.